United States Patent
Comstock, II et al.

(10) Patent No.: US 8,599,374 B1
(45) Date of Patent: Dec. 3, 2013

(54) HYPERSPECTRAL IMAGING SYSTEMS AND METHODS FOR IMAGING A REMOTE OBJECT

(71) Applicant: Corning Incorporated, Corning, NY (US)

(72) Inventors: Lovell Elgin Comstock, II, Charlestown, NH (US); Richard Lynton Wiggins, Keene, NH (US); Kenneth Smith Woodard, New Boston, NH (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 13/799,958

(22) Filed: Mar. 13, 2013

Related U.S. Application Data

(60) Provisional application No. 61/726,650, filed on Nov. 15, 2012.

(51) Int. Cl.
*G01J 3/04* (2006.01)

(52) U.S. Cl.
USPC .......................................................... 356/310

(58) Field of Classification Search
USPC ................... 356/310, 326, 328, 334; 348/337
See application file for complete search history.

(56) References Cited

U.S. PATENT DOCUMENTS

| | | | |
|---|---|---|---|
| 5,871,628 A | 2/1999 | Dabiri et al. | |
| 6,160,618 A | 12/2000 | Garner | |
| 6,495,818 B1 | 12/2002 | Mao | |
| 6,504,943 B1 | 1/2003 | Sweatt et al. | |
| 6,859,275 B2 | 2/2005 | Fateley et al. | |
| 7,106,435 B2 | 9/2006 | Nelson | |
| 7,282,715 B2 | 10/2007 | Barron | |
| 7,554,667 B1 | 6/2009 | Kampe | |
| 7,583,419 B2 | 9/2009 | Kleiman | |
| 7,697,137 B2 | 4/2010 | Comstock, II | |
| 2002/0141051 A1* | 10/2002 | Vogt et al. | 359/385 |

(Continued)

FOREIGN PATENT DOCUMENTS

| | | |
|---|---|---|
| CA | 2437315 | 8/2002 |
| CN | 101268931 | 9/2008 |

(Continued)

OTHER PUBLICATIONS

Possible Prior Art—http://www.ti.com/solution/dlp_hyperspectral_imaging.

(Continued)

*Primary Examiner* — Tarifur Chowdhury
*Assistant Examiner* — Abdullah Nur
(74) *Attorney, Agent, or Firm* — Walter M Douglas

(57) ABSTRACT

A hyperspectral imaging system and a method are described herein for providing a hyperspectral image of an area of a remote object (e.g., scene of interest). In one aspect, the hyperspectral imaging system includes at least one optic, a rotatable disk (which has at least one spiral slit formed therein), a spectrometer, a two-dimensional image sensor, and a controller. In another aspect, the hyperspectral imaging system includes at least one optic, a rotatable disk (which has multiple straight slits formed therein), a spectrometer, a two-dimensional image sensor, and a controller. In yet another aspect, the hyperspectral imaging system includes at least one optic, a rotatable drum (which has a plurality of slits formed on the outer surface thereof and a fold mirror located therein), a spectrometer, a two-dimensional image sensor, and a controller.

14 Claims, 8 Drawing Sheets

(56) References Cited

U.S. PATENT DOCUMENTS

| | | |
|---|---|---|
| 2004/0031906 A1 | 2/2004 | Glecker |
| 2004/0129889 A1 | 7/2004 | Barron |
| 2004/0141213 A1 | 7/2004 | Kleiman |
| 2004/0195510 A1 | 10/2004 | Carr et al. |
| 2005/0243312 A1 | 11/2005 | Geshwind et al. |
| 2006/0092414 A1 | 5/2006 | Geshwind et al. |
| 2008/0035834 A1 | 2/2008 | Gleckler |
| 2008/0285027 A1 | 11/2008 | Lanoue |
| 2011/0050845 A1 | 3/2011 | Muhammed |

FOREIGN PATENT DOCUMENTS

| | | |
|---|---|---|
| GB | 2403614 | 1/2005 |
| GB | 2403615 | 1/2005 |
| WO | 98/08085 | 2/1998 |
| WO | 01/81949 | 11/2001 |
| WO | 02/061483 | 8/2002 |
| WO | 2009/070121 | 6/2009 |

OTHER PUBLICATIONS

Machine Translation of CN101268931.

* cited by examiner

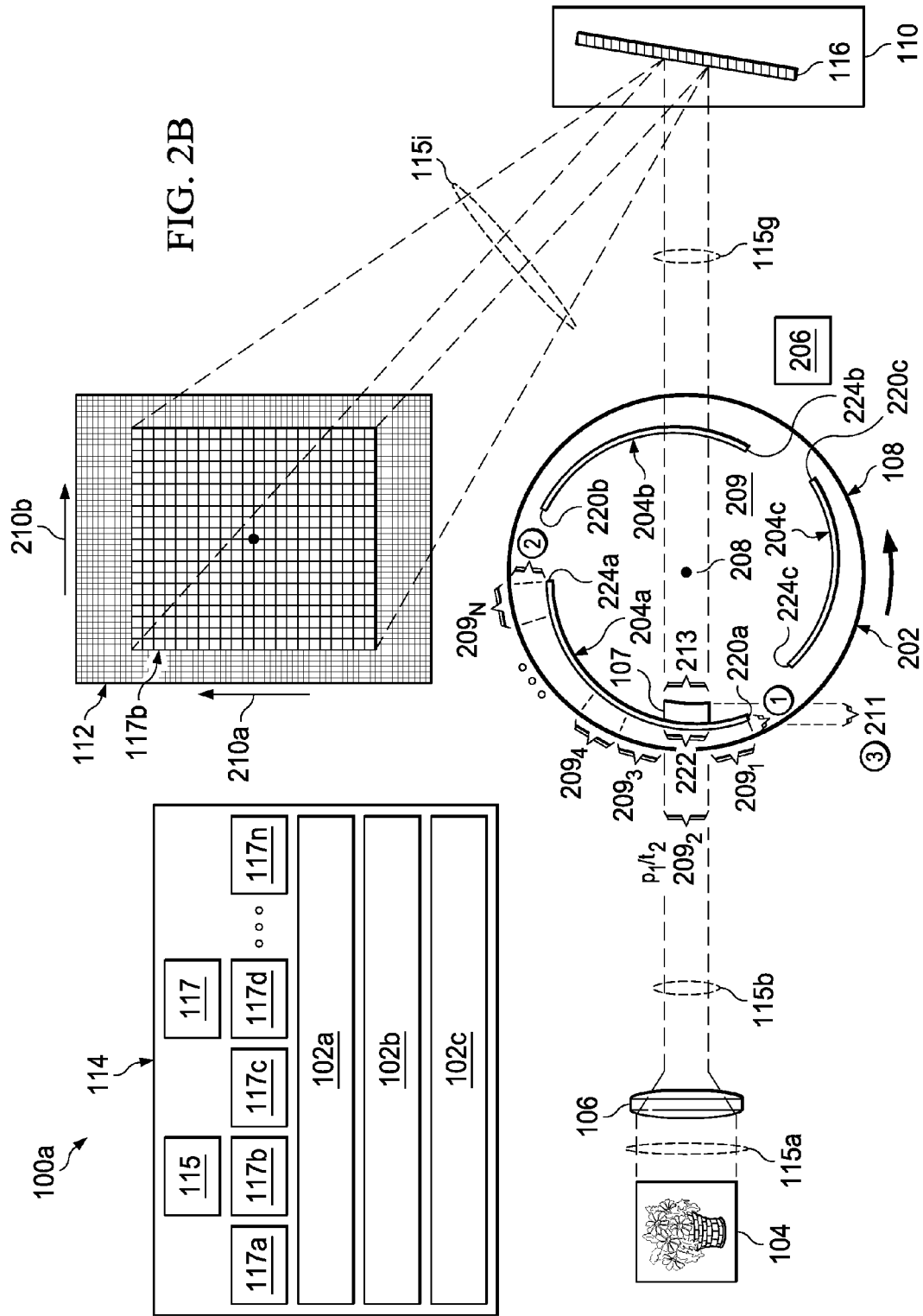

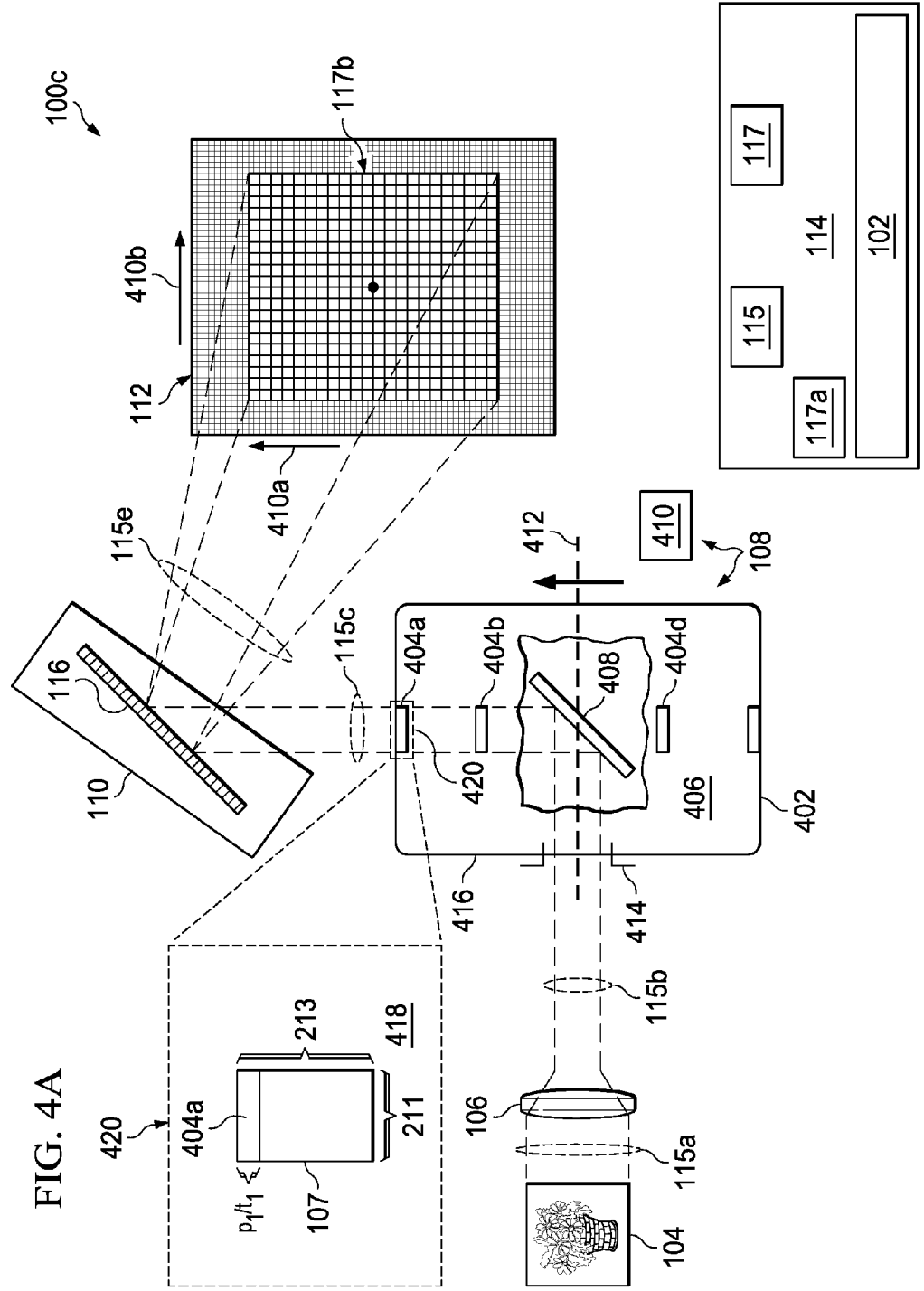

HYPERSPECTRAL IMAGING SYSTEMS AND METHODS FOR IMAGING A REMOTE OBJECT

CLAIM OF PRIORITY

This application claims the benefit of U.S. Provisional Application Ser. No. 61/726,650 filed on Nov. 15, 2012 and entitled "Hyperspectral Imaging System and Method for Imaging a Remote Object". The contents of this document are hereby incorporated by reference herein.

RELATED PATENT APPLICATION

This application is related to a previously filed U.S. patent application Ser. No. 13/555,428 filed on Jul. 23, 2012 and entitled "Hyperspectral Imaging System and Method for Imaging a Remote Object". The contents of this related patent application are hereby incorporated by reference herein.

TECHNICAL FIELD

The present invention relates to a hyperspectral imaging system and a method for providing a hyperspectral image of an area of a remote object (e.g., scene of interest). In one aspect, the hyperspectral imaging system includes at least one optic, a rotatable disk (which has at least one spiral slit formed therein), a spectrometer, a two-dimensional image sensor, and a controller. In another aspect, the hyperspectral imaging system includes at least one optic, a rotatable disk (which has multiple straight slits formed therein), a spectrometer, a two-dimensional image sensor, and a controller. In yet another aspect, the hyperspectral imaging system includes at least one optic, a rotatable drum (which has a plurality of slits formed in the outer surface thereof and a fold mirror located therein), a spectrometer, a two-dimensional image sensor, and a controller.

BACKGROUND

The traditional hyperspectral imaging system typically has an imaging lens which forms an image of a remote object of interest onto a fixed slit which is followed by a spectrometer. The spectrometer may be configured as an Offner spectrometer, a Dyson spectrometer, or any one of several other types of spectrometers. However, the hyperspectrometer architecture with the fixed slit is limited to forming a hyperspectral of a single line of light from the remote object. In addition, the hyperspectrometer architecture with the fixed slit is limited to filling only those pixels on the image sensor that correspond to the spectra of the fixed slit. There are currently two known techniques for extending the hyperspectral image from a single line of light from the remote object to a two dimensional area of the remote object. The first known technique involves moving the entire hyperspectral imaging system in a direction perpendicular to the fixed slit and synchronizing the image taking with that motion to obtain the hyperspectral image of an area of the remote object. This technique is often called the "push broom" method. The second known technique involves placing a rotating mirror in front of the imaging lens and then synchronizing the image taking with the rotation of the mirror to obtain the hyperspectral image of an area of the remote object. Although the traditional hyperspectral imaging system and these known techniques for obtaining the hyperspectral image of an area of the remote object may work well in some applications it is still desirable to develop new hyperspectral imaging systems that can be used to obtain the hyperspectral image of an area of the remote object.

SUMMARY

Hyperspectral imaging systems and methods for providing a hyperspectral image of an area of a remote object have been described in the independent claims of the present application. Advantageous embodiments of the hyperspectral imaging systems and the methods for providing a hyperspectral image of an area of a remote object have been described in the dependent claims.

In one aspect of the present invention, there is a hyperspectral imaging system (and an associated method) for providing a hyperspectral image of a two-dimensional area of a remote object. The hyperspectral imaging system comprising: (a) at least one optic configured to receive light associated with the remote object; (b) a disk with a spiral slit formed therein, where the disk comprises a surface configured to receive the light from the at least one optic, and where the surface is further positioned at an image plane of the at least one optic; (c) an actuator that rotates the disk; (d) a controller configured to control the actuator such that the disc is rotated so a first portion of the spiral slit is positioned to allow a first line of light associated with the remote object to pass there through; (e) a spectrometer comprising at least a dispersion device configured to receive the first line of light and output a first dispersed line of light; (f) a two-dimensional image sensor configured to receive the first dispersed line of light and provide a first two dimensional image of the first dispersed line of light; (g) the controller configured to obtain the first two dimensional image and to control the actuator such that the disc is rotated so a second portion of the spiral slit is positioned to allow a second line of light associated with the remote object to pass there through; (h) the spectrometer comprising at least the dispersion device configured to receive the second line of light and output a second dispersed line of light; (i) the two-dimensional image sensor configured to receive the second dispersed line of light and provide a second two dimensional image of the second dispersed line of light; (j) the controller configured to obtain the second two dimensional image; and (k) the controller repeatedly controls the actuator such that the disc is rotated so different portions of spiral slit are positioned to allow different lines of light associated with the light of the remote object to pass there through while repeatedly obtaining two dimensional images of the different dispersed lines of light from the two-dimensional image sensor and combining the first and second two dimensional images and the different two dimensional images to provide the hyperspectral image of the two-dimensional area of the remote object.

In another aspect of the present invention, there is a hyperspectral imaging system (and an associated method) for providing a hyperspectral image of a two-dimensional area of a remote object. The hyperspectral imaging system comprising: (a) at least one optic configured to receive light associated with the remote object; (b) a disk with a plurality of straight slits formed therein, where the disk comprises a surface configured to receive the light from the at least one foreoptic, and where the surface is further positioned at an image plane of the at least one optic; (c) an actuator that rotates the disk; (d) a controller configured to control the actuator such that the disc is rotated so a first straight slit of the plurality of straight slits is positioned to allow a first line of light associated with the remote object to pass there through; (e) a spectrometer comprising at least a dispersion device configured to receive the first line of light and output a first dispersed line of light; (f) a two-dimensional image sensor configured to receive the first dispersed line of light and provide a first two dimensional image of the first dispersed line of light; (g) the controller configured to obtain the first two dimensional image and control the actuator such that the disc is rotated so a second straight slit of the plurality of straight slits is positioned to allow a second line of light associated with the remote object to pass there through; (h) the spectrometer comprising at least the dispersion device configured to receive the second line of light and output a second dispersed line of light; (i) the two-dimensional image sensor configured to receive the second dispersed line of light and provide a second two dimensional image of the second dispersed line of light; (j) the controller configured to obtain the second two dimensional image; and (k) the controller repeatedly controls the actuator such that the disc is rotated so different straight slits of the plurality of straight slits are positioned to allow different lines of light associated with the light of the remote object to pass there through while repeatedly obtaining two dimensional images of the different dispersed lines of light from the two-dimensional image sensor and combining the first and second two dimensional images and the different two dimensional images to provide the hyperspectral image of the two-dimensional area of the remote object.

In yet another aspect of the present invention, there is a hyperspectral imaging system (and an associated method) for providing a hyperspectral image of a two-dimensional area of a remote object. The hyperspectral imaging system comprising: (a) at least one optic configured to receive light associated with the remote object; (b) a drum with at least one slit formed in a surface thereof and a fold mirror located therein, where the rotating drum has an opening on one side thereof through which the light from the at least one optic passes and is reflected by the fold mirror towards an inner portion of the surface, and where the inner portion of the surface is positioned at an image plane of the at least one optic; (c) an actuator that rotates the drum; (d) a controller configured to control the actuator such that the drum is rotated so a first slit of the at least one slit is positioned to allow a first line of light associated with the remote object to pass there through; (e) a spectrometer comprising at least a dispersion device configured to receive the first line of light and output a first dispersed line of light; (f) a two-dimensional image sensor configured to receive the first dispersed line of light and provide a first two dimensional image of the first dispersed line of light; (g) the controller configured to obtain the first two dimensional image and control the actuator such that the drum is rotated so the first slit of the at least one slit is positioned to allow a second line of light associated with the remote object to pass there through; (h) the spectrometer comprising at least the dispersion device configured to receive the second line of light and output a second dispersed line of light; (i) the two-dimensional image sensor configured to receive the second dispersed line of light and provide a second two dimensional image of the second dispersed line of light; (j) the controller configured to obtain the second two dimensional image; and (k) the controller repeatedly controls the actuator such that the drum is rotated so the first slit of the at least one slit is positioned to allow different lines of light associated with the light of the remote object to pass there through while repeatedly obtaining two dimensional images of the different dispersed lines of light from the two-dimensional image sensor and combining the first and second two dimensional images and the different two dimensional images to provide the hyperspectral image of the two-dimensional area of the remote object.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be had by reference to the following detailed description when taken in conjunction with the accompanying drawings wherein:

FIGS. 2A-2B are several diagrams illustrating an exemplary hyperspectral imaging system in which the scannable slit mechanism is a disk (which has at least one spiral slit formed therein) and an actuator that rotates the disk about an axis in accordance with a first embodiment of the present invention;

FIGS. 4A-4B are several diagrams illustrating an exemplary hyperspectral imaging system in which the scannable slit mechanism is a rotating drum (which has at least one straight slit in a surface thereof and a fold mirror located therein) and an actuator that rotates the drum about axis in accordance with a third embodiment of the present invention.

DETAILED DESCRIPTION

Figure 1:
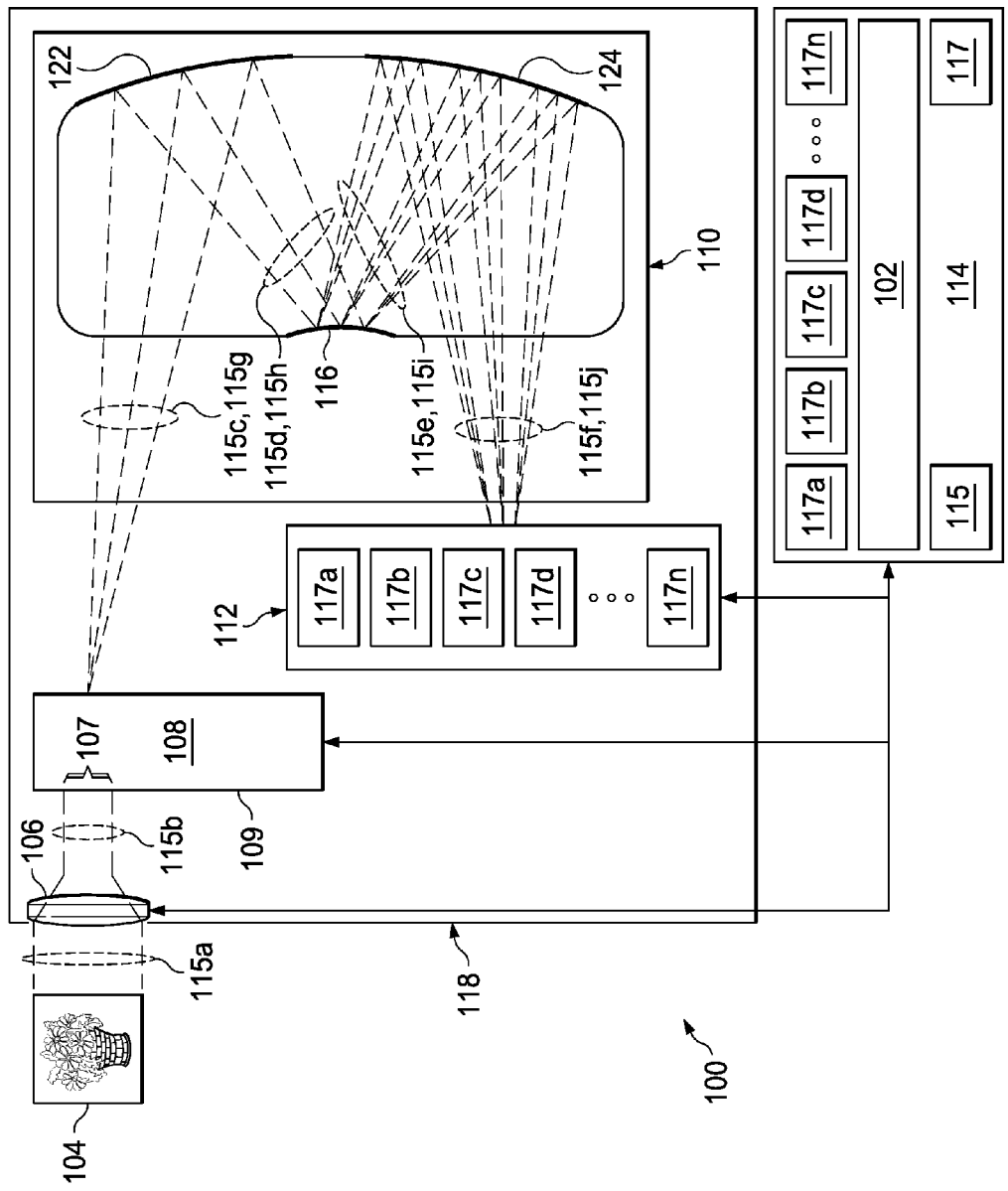
FIG. 1 is a diagram illustrating the basic components of an exemplary hyperspectral imaging system which has a scannable slit mechanism in accordance with an embodiment of the present invention.

Referring to FIG. 1, there is a diagram illustrating the basic components of an exemplary hyperspectral imaging system 100 configured for providing a hyperspectral image 102 of an area of a remote object 104 in accordance with an embodiment of the present invention. The hyperspectral imaging system 100 includes one or more optic(s) 106, a scannable slit mechanism 108, a spectrometer 110, a two-dimensional image sensor 112, and a controller 114. The spectrometer 110 may be an Officer spectrometer (shown), a Dyson spectrometer or any one of other well known spectrometers which contain a dispersion device 116. For instance, the spectrometer 110 may contain a dispersion device 116 configured as a prism 116 which corresponds to a refractive based spectral imaging assembly. Or, the spectrometer 110 may contain a dispersion device 116 configured as a diffraction grating 116 which corresponds to a diffractive based spectral imaging assembly (shown). Furthermore, the hyperspectral imaging system 100 may include a housing 118 which encloses and supports the optic(s) 106, the scannable slit mechanism 108, the spectrometer 110, and the two-dimensional image sensor 112. In this example, the controller 114 is shown as being positioned outside of the housing 118 but is still operatively coupled to the optic(s) 106 (in order to focus the optic(s) 106), the scannable slit mechanism 108, and the two-dimensional image sensor 112. The hyperspectral imaging system 100 can incorporate other components which are well known to those skilled in the art but for clarity only those components 106, 108, 110, 112, 114, 116, and 118 which are needed to explain the present invention will be discussed in detail herein.

The hyperspectral imaging system 100 is positioned such that the optic(s) 106 receive light 115a from the remote object 104 and are configured to direct focused light 115b which represents an image 107 of the remote object 104 on the scannable slit mechanism 108. The scannable slit mechanism 108 is positioned such that the surface 109 which receives the light 115b from the optic(s) 106 is placed at an image plane of the optic(s) 106. The scannable slit mechanism 108 receives the light 115b and provides at least one first line of light 115c to the spectrometer 110. In this example, the spectrometer 110 is configured as an Offner spectrometer and includes a first mirror 122 that receives the at least one first line of light 115c from the scannable slit mechanism 108 and reflects the at least one first line of light 115d to the diffraction grating 116 which directs at least one diffracted light 115e to a secondary mirror 124 which reflects the at least one diffracted light 115f to the two-dimensional image sensor 112. The two-dimensional image sensor 112 generates a two-dimensional image 117a of the at least one diffracted light 115f.

The controller 114 receives and stores the two-dimensional image 117a and then interacts with the scannable slit mechanism 108 such that it is reconfigured to provide at least one different line of light 115g from the remote object 104 to the spectrometer 110. The spectrometer's first mirror 122 receives the at least one different line of light 115g from the scannable slit mechanism 108 and reflects the at least one different line of light 115h to the diffraction grating 116 which directs at least one diffracted light 115i to a secondary mirror 124 which reflects the at least one diffracted light 115j to the two-dimensional image sensor 112. The two-dimensional image sensor 112 generates a two-dimensional image 117b of the at least one diffracted light 115j. The controller 114 receives and stores the two-dimensional image 117b of the diffracted light 115j from the two-dimensional image sensor 112. Thereafter, the controller 114 interacts with the scannable slit mechanism 108 and the two-dimensional image sensor 112 in a similar manner to obtain different two-dimensional images 117c, 117d . . . 117n associated with different lines of light from the remote object 104 (note: the different lines of light 115c, 115g etc. . . . are typically contiguous to one another and when combined would represent the entire imaged area of the remote object 104). The controller 114 combines the two-dimensional images 117a, 117b, 117c . . . 117n to provide the hyperspectral image 102 of an area of the remote object 104. A detailed discussion about the configuration and operation of several different embodiments of the hyperspectral imaging system 100 incorporating several different types of scannable slit mechanisms 108 is provided below with respect to FIGS. 2-4.

Figure 2A:
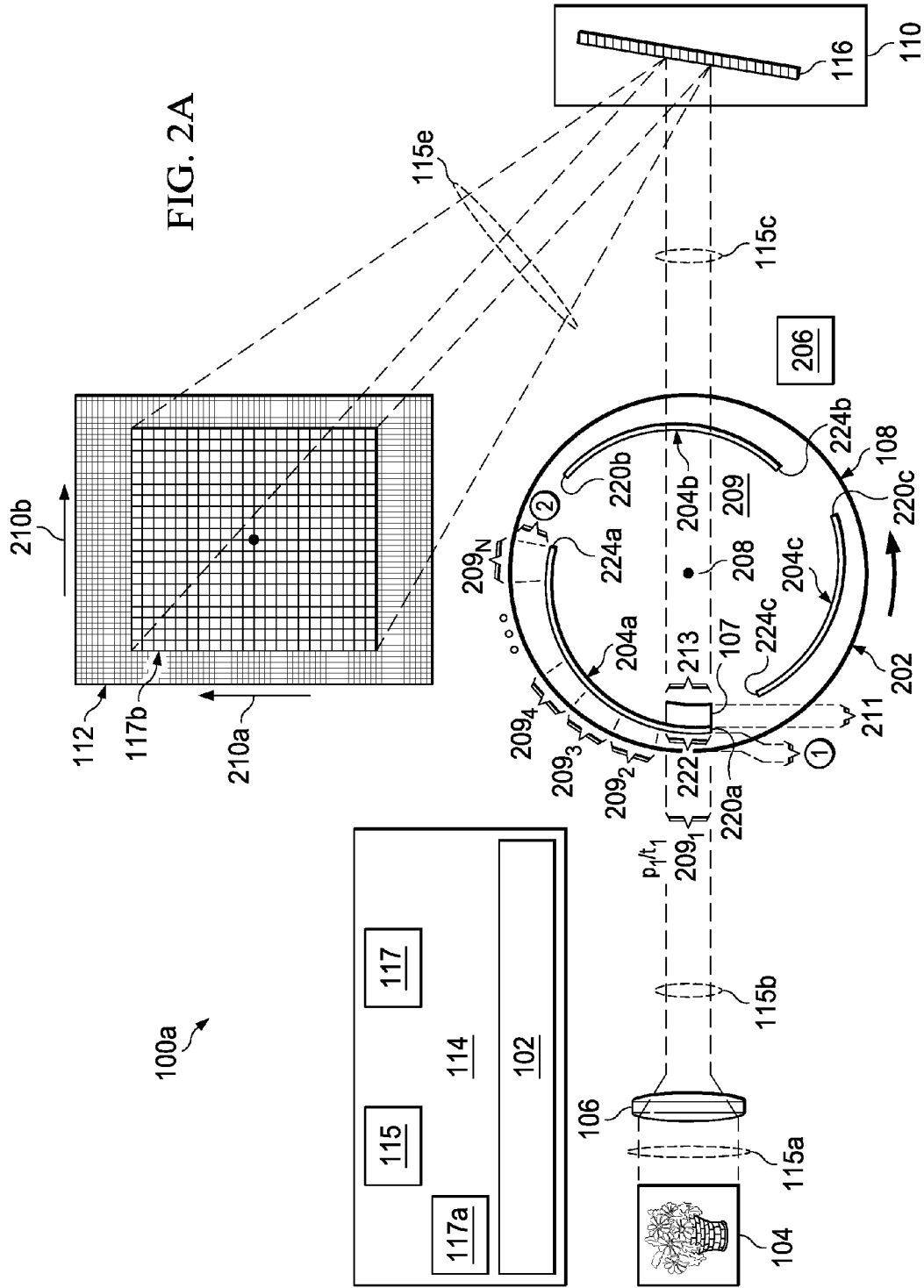

Referring to FIGS. 2A-2B, there several diagrams illustrating the hyperspectral imaging system 100a in which the scannable slit mechanism 108 is a disk 202 with at least one spiral slit 204 (three spiral slits 204a, 204b, and 204c are shown in this example) formed therein and an actuator 206 that rotates the disk 202 about axis 208 in accordance with a first embodiment of the present invention. The hyperspectral imaging system 100a includes the optic(s) 106, the rotating disk 202, the actuator 206, the spectrometer 110 (which includes at least an dispersion device 116), the two-dimensional image sensor 112, the controller 114, and the housing 118 (not shown). It should be appreciated that the optic(s) 106, the disk 202, the spectrometer 110 (dispersion 116), and the two-dimensional image sensor 112 would be positioned with respect to one another such that the light rays would be properly directed from one component to another component. However, to help explain the various features of the hyperspectral imaging system 110a the orientations of the optic(s) 106 with respect to the disk's surface 209 have been changed. For instance, the disk's surface 209 would in practice be facing the major surfaces of the optic(s) 106 rather than facing the reader as shown. And, the plane of rotation of the disk 202 on axis 208 would be perpendicular to the reader.

As shown in FIGS. 2A-2B, there is an example where the hyperspectral imaging system 100a is configured such that the disk 202 has a first portion $209_1$ of the spiral slit 204a in one position "p1" at a first time "t1" (see FIG. 2A) and then another portion $209_2$ of the spiral slit 204a is in position "p1" at a second time "t2" (see FIG. 2B). In FIG. 2A, the hyperspectral imaging system 100a is positioned at the first time "t1" such that the optic(s) 106 receives light 115a associated with the remote object 104 and directs focused light 115b which represents an image 107 of the remote object 104 on the disk 202. In particular, the controller 114 would have interacted with the actuator 206 to rotate the disk 202 on the axis 208 such that a first portion $209_1$ of the spiral slit 204a is in position "p1" at the first time "t1". At time "t1", the first portion 209a of the spiral slit 204a is positioned at or near an image plane of the optic(s) 106 so as to pass a first line of light 115c associated with the image 107 to the spectrometer 110 which is received by the dispersion element 116 by way of, for example, the first mirror 122 (see FIG. 1). Again, the spectrometer 110 can be any well known spectrometer 110 which has a dispersion device 116 (e.g., prism 116, diffraction grating 116). The dispersion device 116 generates dispersed light 115e which is received by the two-dimensional image sensor 112 by way of, for example, the second mirror 124 (see FIG. 1). The two-dimensional image sensor 112 generates a two-dimensional image 117a which includes one axis 210a representing the spatial information of the dispersed light 115e (e.g., the zero order image of a diffracted light 115e—if the diffraction grating 116 is used) and another axis 210b representing the spectral information of the dispersed light 115e (e.g., non-zero order images of the diffracted light 115e—if the diffraction grating 116 is used). The controller 114 receives and stores the two-dimensional image 117a and interacts with the actuator 206 to rotate the disk 202 such that a second portion $209_2$ the spiral slit 204a is in position "p1" at time "t2" to pass a different line of light 115g associated with the image 107 from the remote object 104 to the spectrometer 110 as discussed next.

In FIG. 2B, the hyperspectral imaging system 100a is shown configured at the second time "t2" where the controller 114 interacted with the actuator 206 to rotate the disk 202 such that the second portion $209_2$ of the spiral slit 204a is in position "p1" at time "t2" so as to pass a second line of light 115g associated with the image 107 of the remote object 104 into the spectrometer 110 which is received by the dispersion device 116 by way of, for example, the first mirror 122 (FIG. 1). As can be seen, the first line of light 115c is contiguous or substantially contiguous with the second line of light 115g associated with the image 107 of the remote object 104. The dispersion device 116 generates dispersed light 115i which is received by the two-dimensional image sensor 112 by way of, for example, the second mirror 124 (FIG. 1). The two-dimensional image sensor 112 generates a two-dimensional image 117b which includes one axis 210a representing the spatial information of the dispersed light 115i (e.g., the zero order image of a diffracted light 115i—if the diffraction grating 116 is used) and another axis 210b representing the spectral information of the dispersed light 115i (e.g., non-zero order images of the diffracted light 115i—if the diffraction grating 116 is used). The controller 114 receives and stores the two-dimensional image 117b. Thereafter, the controller 114 interacts with actuator 206 to rotate the disk 202 at different times "t3", "t4" . . . "tn" so that the remaining portions $209_3$, $209_4$ . . . $209_n$ of the spiral slit 204a are sequentially located in position "p1" while at times "t3", "t4" . . . "tn" the two-dimensional image sensor 112 is activated to obtain different two-dimensional images 117c, 117d . . . 117n of the different lines of dispersed light of remote object 104. The controller 114 combines the two-dimensional images 117a, 117b, 117c . . . 117n to provide the hyperspectral image 102a of the entire image 107 associated with an area of the remote object 104. In this example, each two-dimensional image 117a, 117b, 117c . . . 117n corresponds to a different line of dispersed light 115e, 115i etc. . . . and the lines of dispersed light 115e, 115i etc. . . . are contiguous with one another such than when their respective spectral images are combined the resulting combination forms the hyperspectral image 102a which represents the image 107 of the area of the remote object 104.

The same process used to obtain the hyperspectral image 102a of the area of the remote object 104 using the first spiral slit 204a would be repeated to obtain a hyperspectral image 102b of the area of the remote object 104 using the second spiral slit 204b and then repeated to obtain a hyperspectral image 102c of the area of the remote object 104 using the third spiral slit 204c. Hence, the disk 202 having three spirals slits 204a, 204b, and 204c enables three different hyperspectral images 102a, 102b and 102c of the same image 107 of the area of the remote object 104 to be obtained per a single 360° rotation of the disk 202. In this example, the combined widths of the different portions $209_1$, $209_2$, $209_3$, $209_4$ . . . $209_n$ of the first spiral slit 204a would be equal to or larger than a width 211 of the image 107 of the remote object 104. And, the height of each of the different portions $209_1$, $209_2$, $209_3$, $209_4$ . . . $209_n$ of the first spiral slit 204a would be equal to or larger than a height 213 of the image 107 of the remote object 104. The second spiral slit 204b and the third spiral slit 204c would typically have the same width and height as the first spiral slit 204a.

In this example, the controller 114 is able to obtain the different two-dimensional images 117a, 117b, 117c . . . 117n which are combined to form one hyperspectral image 102a by using the first spiral slit 204a during a 120° rotation of the disk 202. Plus, the controller 114 obtains different two-dimensional images which are combined to form two hyperspectral images 102b and 102c by using the second spiral slit 204b and the third spiral slit 204c during the remaining 240° rotation of the disk 202. Alternatively, if the disk 202 only had one spiral slit 204 then the controller 114 would provide one hyperspectral image of the remote object 104 per a single rotation of the disk 202. Likewise, if the disk 202 had two spiral slits then the controller 114 would provide two hyperspectral images of the remote object 104 per a single rotation of the disk 202. In any case, the controller 114 can obtain the two-dimensional images 117a, 117b, 117c . . . 117n at any desired data rate but typically it might be after the respective spiral slit 204a, 204b and 204c has been rotated enough so that it's image (respective line of light from the image 107) on the two-dimensional image sensor 112 has moved laterally by one pixel.

In the aforementioned example, the spiral slits 204a, 204b and 204c are separated from one another far enough such that the image 107 of the remote object 104 is located in only one of the spiral slits 204a, 204b or 204c at any given time. In other words, the image 107 could be entirely located in space between the spiral slits 204a and 204b, or between the spiral slits 204b and 204c, or between the spiral slits 204a and 204c. To accomplish this, the disk 202 and in particular the spiral slits 204a, 204b and 204c formed on the interior portion thereof are positioned based on the specific size and location of the image 107 which will eventually be formed by the fore optic(s) 106. In particular, the disk 202 may have a specific diameter and the image 107 will have a predetermined width 211 and height 213 on a specific location on the surface 209 of the disk 202. Plus, the spiral slits 204a, 204b and 204c would each have one end 220a, 220b and 220c that is located a predetermined distance "1" from the edge of the disk 202 so as to be aligned with one end 222 of the image 107. In addition, the spiral slits 204a, 204b and 204c would each have an opposite end 224a, 224b and 224c that is located a predetermined distance "2" from the edge of the disk 202 so as to be aligned with an opposite end 226 of the image 107. In other words, each spiral slit 204a, 204b and 204c is sized such that the difference between distances "1" and "2" which relates to the distance between their respective ends 220a-224a, 220b-224b and 222c-224c with respect to the outer edge of the disk 202 is the same as or larger than the width 211 of the image 107 of the remote object 104.

Alternatively, the spiral slits 204a, 204b, and 204c can be positioned with respect to one another such that any two of the spiral slits 204a and 204b (for example) at a given time can each have a portion which simultaneously passes a different line of light from the image 107 of the remote object 104 into the spectrometer 110. In this case, the controller 114 upon receiving the corresponding two-dimensional image from the two-dimensional image sensor 112 would have to process the two-dimensional image to separate the two-dimensional image associated with first spiral slit 204a from the two-dimensional image associated with second spiral slit 204b. Then, the controller 114 would combine the various two-dimensional images associated with only the first spiral slit 204a to form the hyperspectral image 102a and combine the various two-dimensional images associated only the second spiral slit 204b to form the hyperspectral image 102b.

Figure 2C:
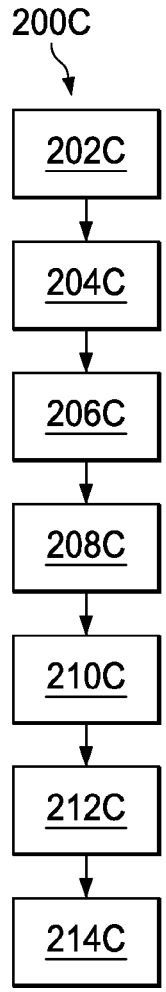
FIG. 2C is a flowchart illustrating the steps of an exemplary method for providing a hyperspectral image of a two-dimensional area of a remote object using the hyperspectral imaging system shown in FIGS. 2A-2B in accordance with the first embodiment of the present invention.

Referring to FIG. 2C, there is a flowchart illustrating the steps of an exemplary method 200C for using the hyperspectral imaging system 100a to provide the hyperspectral image 102 of the two-dimensional area 107 of the remote object 104 in accordance with the first embodiment of the present invention. The method comprises the steps of: (a) providing the hyperspectral imaging system 100a which includes the optic(s) 106, the rotatable disk 202 (with at least one spiral slit 204 formed therein), the actuator 206, the spectrometer 110 (which includes at least an dispersion device 116), the two-dimensional image sensor 112, and the controller 114 (step 202C); (b) positioning the optic(s) 106 to receive light 115a associated with the remote object 104 (step 204C); (c) controlling the actuator 206 such that the disc 202 is rotated so a first portion $209_1$ of the spiral slit 204 is positioned to allow a first line of light 115c associated with the remote object 104 to pass there through to the spectrometer 110 comprising at least a dispersion device 116 configured to receive the first line of light 115c and output a first dispersed line of light 115e to the two-dimensional image sensor 112 (step 206C); (d) obtaining a two dimensional image 117a of the first dispersed line of light 115e from the two-dimensional image sensor 112 (step 208C); (e) controlling the actuator 206 such that the disc 202 is rotated so a second portion $209_2$ of the spiral slit 204 is positioned to allow a second line of light 115g associated with the remote object 104 to pass there through to the spectrometer 110 comprising at least the dispersion device 116 configured to receive the second line of light 115g and output a second dispersed line of light 115i to the two-dimensional image sensor 112 (step 210C); (f) obtaining a two dimensional image 117b of the second dispersed line of light 115i from the two-dimensional image sensor 112 (step 212C); and (g) repeatedly controlling the actuator 206 such that the disc 202 is rotated so different portions $209_3$, $209_4$ ... $209_n$ of the spiral slit 204 are positioned to allow different lines of light associated with the light 107 of the remote object 104 to pass there through while repeatedly obtaining two dimensional images 117c, 117d ... 117n of the different dispersed lines of light from the two-dimensional image sensor 112 and combining the first and second two dimensional images 117a and 117b and the different two dimensional images 117c, 117d ... 117n to provide the hyperspectral image 102 of the two-dimensional area of the remote object 104 (step 214C). In one example, the controller 114 can control the actuator 206 to rotate the disk 202 at a continuous constant speed while obtaining the first and second two dimensional images 117a and 117b and the different two dimensional images 117c, 117d ... 117n. In the above example, the controller 114 may include a processor 115 that interfaces with a memory 117 which stores processor-executable instructions to execute those processor-executable instructions to perform steps 204C, 206C, 208C, 210C, 212C, and 214C.

If desired, the scanning disk 202 and actuator 206 could be added to existing designs without significant impact to the system's size. Plus, the resulting enhanced system (i.e., the hyperspectral imaging system 100a) would provide nearly 100% scan efficiency. Other traditional scanning systems like galvo driven scanners that incorporate a scan mirror in front of the fore optic, requires feedback from a scan device to know which line in the remote object is being passed to the spectrometer. However, in the hyperspectral imaging system 100a if the two-dimensional image sensor 112 is large enough to image the zero order image and the diffracted image then the location of the zero order image can provide this information (i.e., which line in the remote object is being passed to the spectrometer) without requiring feedback from some scan device. Additionally, the traditional galvo driven scanners are a source of vibration and can have higher power requirements when compared to the constant speed rotational disk 202 used in the hyperspectral imaging system 100a. Further, traditional polygon scanners would typically have poor scan efficiency, additional reflective surfaces, and when positioned between the foreoptic and the remote object would require significant increase in system size when compared to the size of the hyperspectral imaging system 100a. In the present invention, the disk 202 could be produced with conventional lithographic techniques (chrome on glass for a visible-short wave infrared (SWIR) application as an example). The disk 202 could also be produced in a metal substrate using the processes defined in the co-assigned U.S. Pat. No. 7,697,137 (the contents of which are incorporated by reference herein). Finally, the disk 202 would be driven by a simple motor 206 (actuator 206) and no speed control or angular position device is required. However, the axial position of the disk 202 needs to be nominally controlled and positioned to be within the depth of focus of the fore optic(s) 106.

Figure 3C:
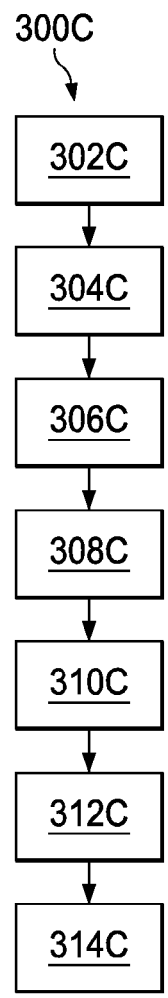
FIG. 3C is a flowchart illustrating the steps of an exemplary method for providing a hyperspectral image of a two-dimensional area of a remote object using the hyperspectral imaging system shown in FIGS. 3A-3B in accordance with the second embodiment of the present invention.
Figure 3A:
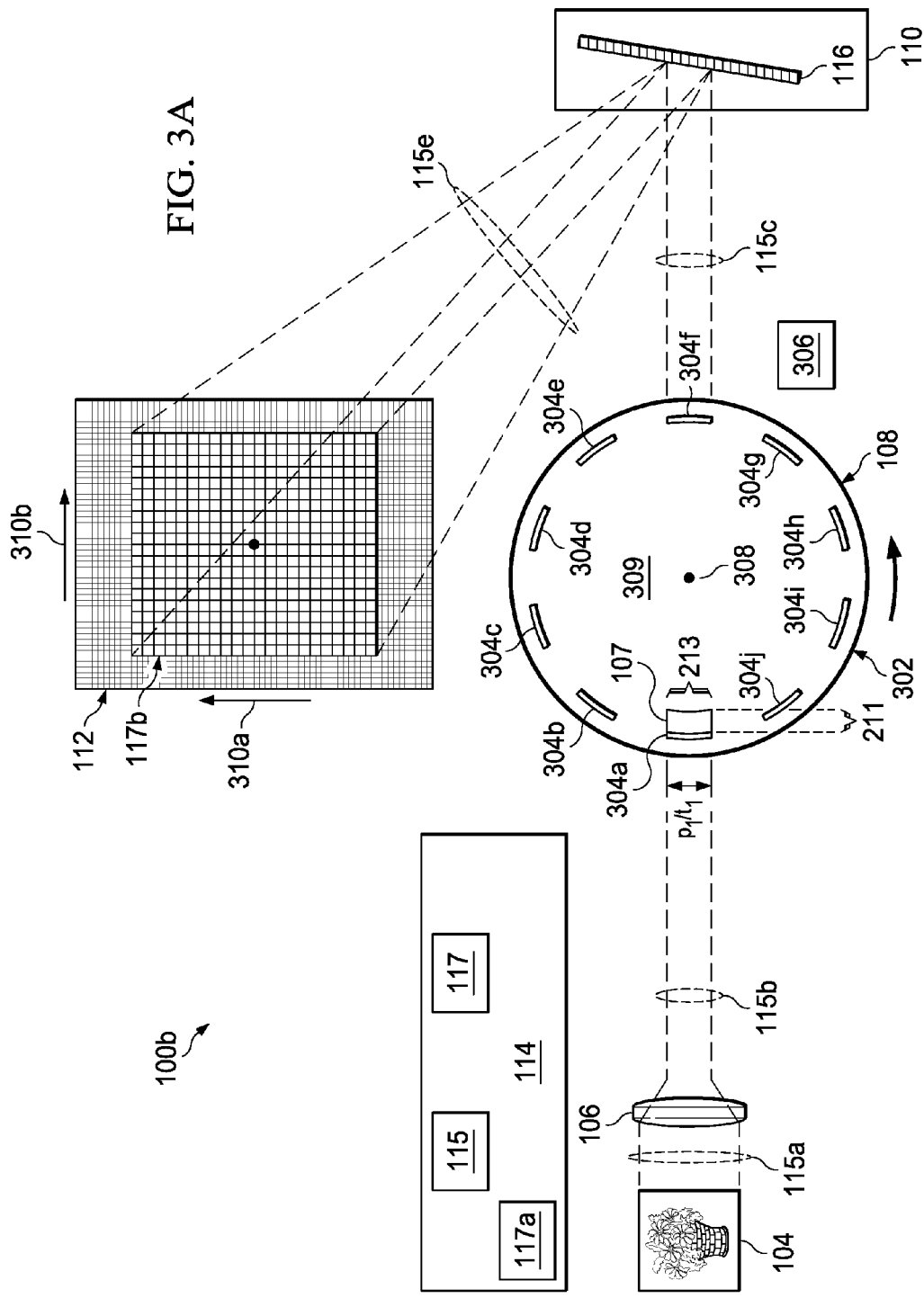
FIGS. 3A-3B are several diagrams illustrating an exemplary hyperspectral imaging system in which the scannable slit mechanism is a disk (which has multiple straight slits formed therein) and an actuator that rotates the disk about an axis in accordance with a second embodiment of the present invention.
Figure 3B:
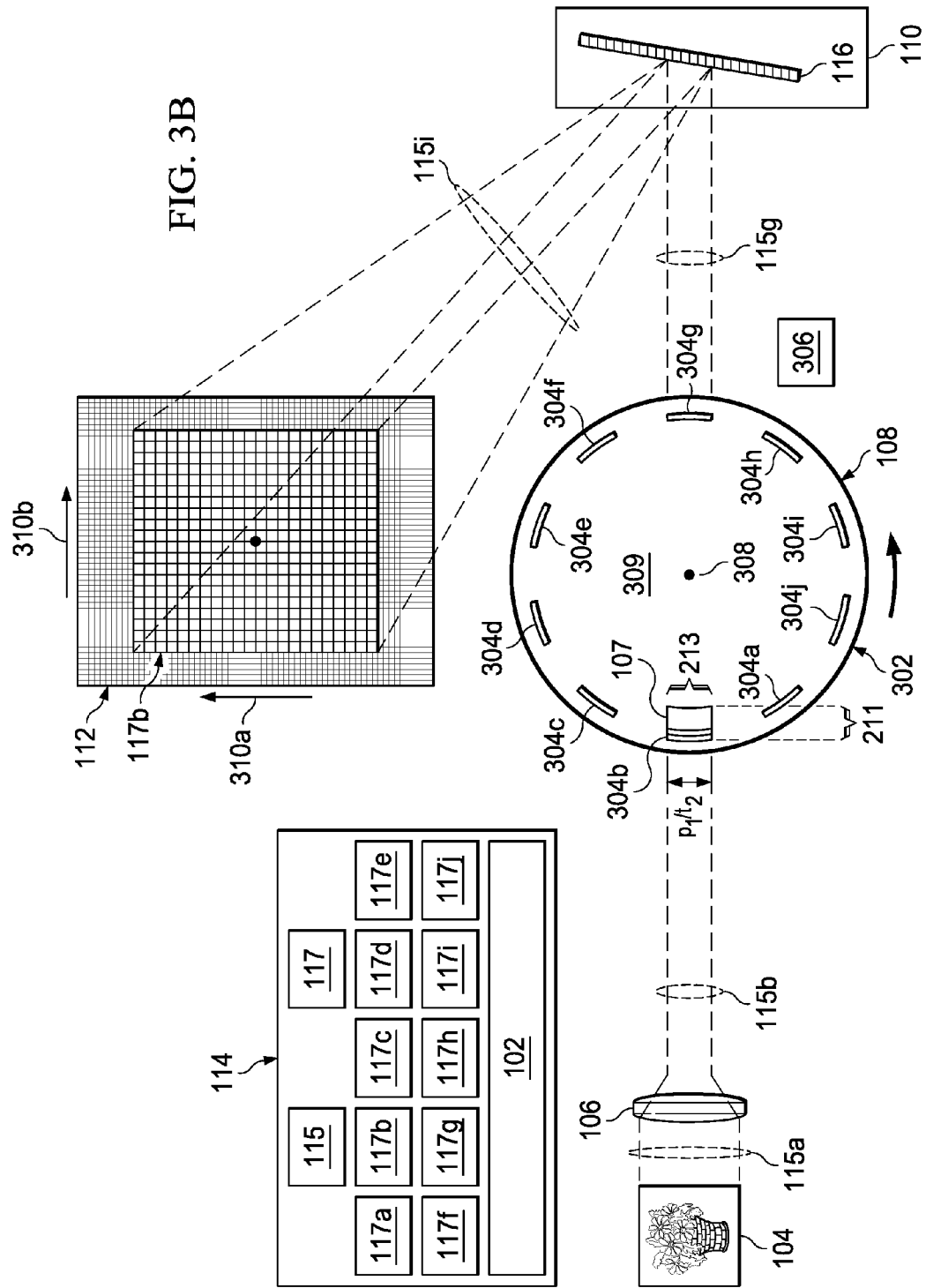

Referring to FIGS. 3A-3B, there several diagrams illustrating the hyperspectral imaging system 100b in which the scannable slit mechanism 108 is a disk 302 with multiple straight slits 304 (ten straight slits 304a, 304b, 304c, 304d, 304e, 304f, 304g, 304h, 304i, 304j are shown in this example) formed therein and an actuator 306 that rotates the disk 302 about axis 308 in accordance with a second embodiment of the present invention. The hyperspectral imaging system 100b includes the optic(s) 106, the rotating disk 302, the actuator 306, the spectrometer 110 (which includes at least an dispersion device 116), the two-dimensional image sensor 112, the controller 114, and the housing 118 (not shown). It should be appreciated that the optic(s) 106, the disk 302, the spectrometer 110 (dispersion 116), and the two-dimensional image sensor 112 would be positioned with respect to one another such that the light rays would be properly directed from one component to another component. However, to help explain the various features of the hyperspectral imaging system 110b the orientations of the optic(s) 106 with respect to the disk's surface 309 have been changed. For instance, the disk's surface 309 would in practice be facing the major surfaces of the optic(s) 106 rather than facing the reader as shown. And, the plane of rotation of the disk 302 on axis 308 would be perpendicular to the reader.

As shown in FIGS. 3A-3B, there is an example where the hyperspectral imaging system 100b is configured such that the disk 302 has one straight slit 304a in one position "p1" at a first time "t1" (see FIG. 3A) and then the disk 302 has the next straight slit 304b in position "p1" at a second time "t2" (see FIG. 3B). In FIG. 3A, the hyperspectral imaging system 100b is positioned at the first time "t1" such that the optic(s) 106 receives light 115a associated with the remote object 104 and directs focused light 115b which represents an image 107 of the remote object 104 on the disk 302. In particular, the controller 114 would have interacted with the actuator 306 to rotate the disk 302 on the axis 308 such that the first straight slit 304a is in position "p1" at the first time "t1". At time "t1", the first straight slit 304a is positioned at or near an image plane of the optic(s) 106 so as to pass a first line of light 115c associated with the image 107 to the spectrometer 110 which is received by the dispersion element 116 by way of, for example, the first mirror 122 (see FIG. 1). Again, the spectrometer 110 can be any well known spectrometer 110 which has a dispersion device 116 (e.g., prism 116, diffraction grating 116). The dispersion device 116 generates dispersed light 115e which is received by the two-dimensional image sensor 112 by way of, for example, the second mirror 124 (see FIG. 1). The two-dimensional image sensor 112 generates a two-dimensional image 117a which includes one axis 310a representing the spatial information of the dispersed light 115e (e.g., the zero order image of a diffracted light 115e—if the diffraction grating 116 is used) and another axis 310b representing the spectral information of the dispersed light 115e (e.g., non-zero order images of the diffracted light 115e—if the diffraction grating 116 is used). The controller 114 receives and stores the two-dimensional image 117a and then interacts with the actuator 306 to rotate the disk 302 such that the second straight slit 304b is in position "p1" at time "t2" to pass a different line of light 115g associated with the image 107 from the remote object 104 to the spectrometer 110 as discussed next.

In FIG. 3B, the hyperspectral imaging system 100b is shown configured at the second time "t2" where the controller 114 interacted with the actuator 306 to rotate the disk 302 such that the second straight slit 304b is in position "p1" at time "t2" so as to pass a second line of light 115g associated with the image 107 of the remote object 104 into the spectrometer 110 which is received by the dispersion device 116 by way of, for example, the first mirror 122 (FIG. 1). As can be seen, the first line of light 115c is contiguous or substantially contiguous with the second line of light 115g associated with the image 107 of the remote object 104. The dispersion device 116 generates dispersed light 115i which is received by the two-dimensional image sensor 112 by way of, for example, the second mirror 124 (FIG. 1). The two-dimensional image sensor 112 generates a two-dimensional image 117b which includes one axis 210a representing the spatial information of the dispersed light 115i (e.g., the zero order image of a diffracted light 115i—if the diffraction grating 116 is used) and another axis 210b representing the spectral information of the dispersed light 115i (e.g., non-zero order images of the diffracted light 115i—if the diffraction grating 116 is used). The controller 114 receives and stores the two-dimensional image 117b. Thereafter, the controller 114 interacts with actuator 306 to rotate the disk 302 at different times "t3", "t4", "t5", "t6", "t7", "t8", "t9", "t10" so that the remaining straight slits 304c, 304d, 304e, 304f, 304g, 304h, 304i, 304j are sequentially located in position "p1" at times "t3", "t4", "t5", "t6", "t7", "t8", "t9", "t10" during which the controller 114 interacts with the two-dimensional image sensor 112 to obtain different two-dimensional images 117c, 117d, 117e, 117f, 117g, 117h, 117i, 117j of the remote object 104. The controller 114 combines the two-dimensional images 117a, 117b, 117c, 117d, 117e, 117f, 117g, 117h, 117i, 117j to provide the hyperspectral image 102 of the entire image 107 associated with an area of the remote object 104. In this example, each two-dimensional image 117a, 117b, 117c, 117d, 117e, 117f, 117g, 117h, 117i, 117j corresponds to a different dispersed line of light 115e, 115i etc. . . . and the dispersed lines of light 115e, 115i etc. . . . are contiguous with one another such than when their respective spectral images are combined the resulting combination forms the hyperspectral image 102 associated with the entire image 107 of the area of the remote object 104.

As can be seen, the disk 302 having the multiple straight slits 304a, 304b, 304c, 304d, 304e, 304f, 304g, 304h, 304i, 304j enables the generation of the hyperspectral image 102 which is associated with the image 107 of the area of the remote object 104 to be obtained per a single 360° rotation of the disk 202. In this example, the length of each of the straight slits 304a, 304b, 304c, 304d, 304e, 304f, 304g, 304h, 304i, 304j would be equal to or larger than a width 211 of the image 107 of the remote object 104. And, the combined widths of the straight slits 304a, 304b, 304c, 304d, 304e, 304f, 304g, 304h, 304i, 304j would be equal to or larger than a height 213 of the image 107 of the remote object 104. As shown, the straight slits 304a, 304b, 304c, 304d, 304e, 304f, 304g, 304h, 304i, 304j would be positioned in an offset manner on the surface 309 of the disk 302 such that when the first straight slit 302a is in position "p1" it would allow the first line of light 115c from the top portion of the image 107 to pass there through and when the second straight slit 302b is in position "p1" it would allow the second line of light 115g from just below the top portion of the image 107 to pass there through and so on for the remaining straight slits 304c, 304d, 304e, 304f, 304g, 304h, 304i, 304j. In this manner, after all of the straight slits 304a, 304b, 304c, 304d, 304e, 304f, 304g, 304h, 304i, 304j have been in position "p1" then all of the lines of light 115c, 115g etc. . . . which pass through them are contiguous to one another such that if all the lines of lights 115c, 115g etc. . . . are combined they would encompass the entire image 107. It should be appreciated that any number of straight slits 304 could be formed on the disk 302, where each straight slit 304 would have the same or different widths so long as all of the widths of the straight slits 304 when combined would be equal to or larger than the height 213 of the image 107 of the remote object 104.

In the aforementioned example, the controller 114 obtains "snapshots" of the two-dimensional images 117a, 117b, 117c, 117d, 117e, 117f, 117g, 117h, 117i, 117j when the corresponding individual straight slits 304a, 304b, 304c, 304d, 304e, 304f, 304g, 304h, 304i, 304j are in position "p1" and aligned parallel with the two-dimensional image sensor 112. Hence, the controller 114 would obtain a "snapshot" of each of the two-dimensional images 117a, 117b, 117c, 117d, 117e, 117f, 117g, 117h, 117i, 117j after rotating the disk 306 about the axis 308 for 36° and in between these 36° rotations no data would be taken from the two-dimensional image sensor 112. As a result, the hyperspectral imaging system 100b does not have 100% scan efficiency since no data is taken from the two-dimensional image sensor 112 when the straight slits 304a, 304b, 304c, 304d, 304e, 304f, 304g, 304h, 304i, 304j are not in position "p1". The controller 114 can obtain the "snapshots" of the two-dimensional images 117a, 117b, 117c, 117d, 117e, 117f, 117g, 117h, 117i, 117j without having to stop the rotation of the disk 306 because the controller 114 would interact with and take the data from the from the two-dimensional image sensor 112 whenever the straight slits 304a, 304b, 304c, 304d, 304e, 304f, 304g, 304h, 304i, 304j are in position "p1".

Referring to FIG. 3C, there is a flowchart illustrating the steps of an exemplary method 300C for using the hyperspectral imaging system 100b to provide the hyperspectral image 102 of the two-dimensional area 107 of the remote object 104 in accordance with the second embodiment of the present invention. The method comprises the steps of: (a) providing the hyperspectral imaging system 100b which includes the optic(s) 106, the rotatable disk 302 (with multiple straight slits 304a, 304b, 304c, 304d, 304e, 304f, 304g, 304h, 304i, 304j (for example) formed therein), the actuator 306, the spectrometer 110 (which includes at least an dispersion device 116), the two-dimensional image sensor 112, and the controller 114 (step 302C); (b) positioning the optic(s) 106 to receive light 115a associated with the remote object 104 (step 304C); (c) controlling the actuator 306 such that the disc 302 is rotated so a first straight slit 304a is positioned to allow a first line of light 115c associated with the remote object 104 to pass there through to the spectrometer 110 comprising at least the dispersion device 116 configured to receive the first line of light 115c and output a first dispersed line of light 115e to the two-dimensional image sensor 112 (step 306C); (d) obtaining a first two dimensional image 117a of the first dispersed line of light 115e from the two-dimensional image sensor 112 (step 308C); (e) controlling the actuator 306 such that the disc 302 is rotated so a second straight slit 304b is positioned to allow a second line of light 115g associated with the remote object 104 to pass there through to the spectrometer 110 comprising at least the dispersion device 116 configured to receive the second line of light 115g and output a second dispersed line of light 115i to the two-dimensional image sensor 112 (step 310C); (f) obtaining a second two dimensional image 117b of the second dispersed line of light 115g from the two-dimensional image sensor 112 (step 312C); and (g) repeatedly controlling the actuator 306 such that the disc 302 is rotated so different straight slits 304c, 304d, 304e, 304f, 304g, 304h, 304i, 304j (for example) are positioned to allow different lines of light associated with the light 107 of the remote object 105 to pass there through while repeatedly obtaining two dimensional images 117c, 117d, 117e, 117f, 117g, 117h, 117i, 117j of the different dispersed lines of light from the two-dimensional image sensor 112 and combining the first and second two dimensional images 117a and 117b and the different two dimensional images 117c, 117d, 117e, 117f, 117g, 117h, 117i, 117j to provide the hyperspectral image 102 of the two-dimensional area of the remote object 104 (step 314C). In one example, the controller 114 can control the actuator 306 to rotate the disk 302 at a continuous constant speed while obtaining the first and second two dimensional images 117a and 117b and the different two dimensional images 117c, 117d . . . 117n. In the above example, the controller 114 may include a processor 115 that interfaces with a memory 117 which stores processor-executable instructions to execute those processor-executable instructions to perform steps 304C, 306C, 308C, 310C, 312C, and 314C.

If desired, the scanning disk 302 and actuator 306 could be added to existing designs without significant impact to the system's size. Plus, the resulting enhanced system (i.e., the hyperspectral imaging system 100b) would provide close to 100% scan efficiency. Other traditional scanning systems like galvo driven scanners that incorporate a scan mirror in front of the fore optic, requires feedback from a scan device to know which line in the remote object is being passed to the spectrometer. However, in the hyperspectral imaging system 100b if the two-dimensional image sensor 112 is large enough to image the zero order image and the diffracted image then the location of the zero order image can provide this information (i.e., which line in the remote object is being passed to the spectrometer) without requiring feedback from some scan device. Additionally, the traditional galvo driven scanners are a source of vibration and can have higher power requirements when compared to the constant speed rotational disk 302 used in the hyperspectral imaging system 100b. Further, traditional polygon scanners would typically have poor scan efficiency, additional reflective surfaces, and when positioned between the foreoptic and the remote object would require a significant increase in system size when compared to the size of the hyperspectral imaging system 100b. In the present invention, the disk 302 could be produced with conventional lithographic techniques (chrome on glass for a visible-short wave infrared (SWIR) application as an example). The disk 302 could also be produced in a metal substrate using the processes defined in the co-assigned U.S. Pat. No. 7,697,137 (the contents of which are incorporated by reference herein). Finally, the disk 302 would be driven by a simple motor 306 (actuator 306) and no speed control or angular position device is required. However, the axial position of the disk 302 needs to be nominally controlled and positioned to be within the depth of focus of the fore optic(s) 106.

Figure 4C:
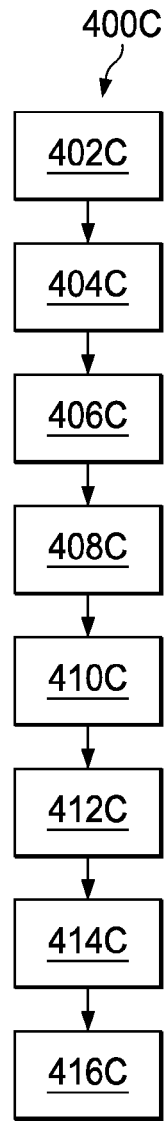
FIG. 4C is a flowchart illustrating the steps of an exemplary method for providing a hyperspectral image of a two-dimensional area of a remote object using the hyperspectral imaging system shown in FIGS. 4A-4B in accordance with the third embodiment of the present invention.
Figure 4B:
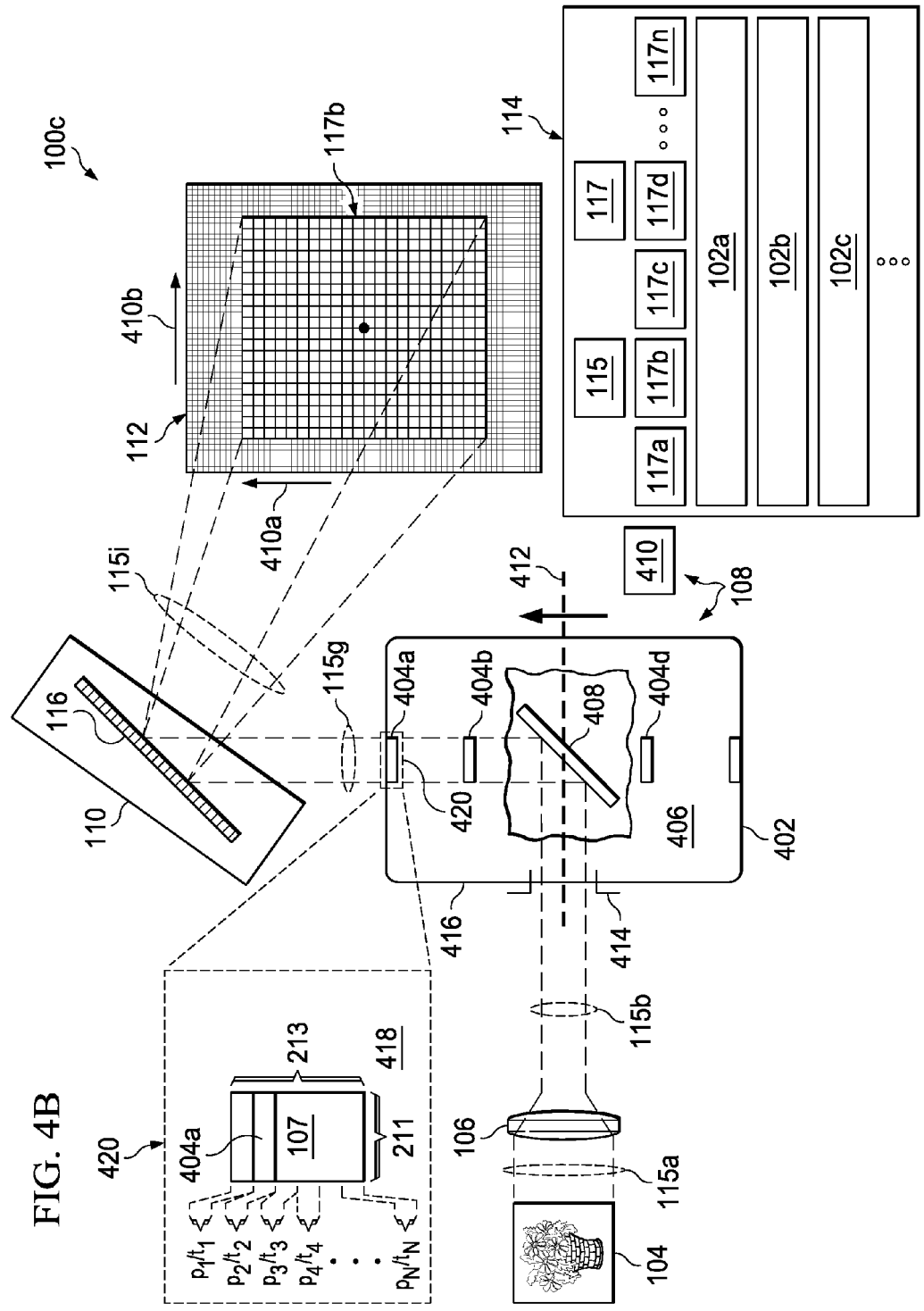

Referring to FIGS. 4A-4B, there several diagrams illustrating the hyperspectral imaging system 100c in which the scannable slit mechanism 108 is a drum 402 with a at least one straight slit 404 (several straight slits 404a, 404b, 404c, 404d and 404e can be seen in this example) in a surface 406 thereof and a fold mirror 408 located therein, and an actuator 410 that rotates the drum 402 about axis 412 in accordance with a third embodiment of the present invention (note: FIGS. 4A-4B have a portion of the surface 406 cut-away so one can see the fold mirror 404 located within an interior of the drum 402). The hyperspectral imaging system 100c includes at least one optic 106, the rotatable drum 402, the actuator 410, the spectrometer 110 (which includes at least an dispersion device 116), the two-dimensional image sensor 112, the controller 114, and the housing 118 (not shown). It should be appreciated that the optic(s) 106, the drum 402, the spectrometer 110 (dispersion 116), and the two-dimensional image sensor 112 would be positioned with respect to one another such that the light rays would be properly directed from one component to another component. As such, the rotating drum 402 would have an opening 414 on one side 416 thereof which the light 115b from the optic(s) 106 passes and is reflected by the fold mirror 408 to form an image 107 of the remote object 104 on an inner portion 418 of the surface 406. The inner portion 418 of the surface 406 would be positioned at an image plane of the optic(s) 106 (see exploded view 420 in FIGS. 4A and 4B).

As shown in FIGS. 4A-4B, there is an example where the hyperspectral imaging system 100c is configured such that the rotating drum 402 has one straight slit 404a in one position "p1" at a first time "t1" (see FIG. 4A) and then rotating drum 402 has the straight slit 404a in position "p2" at a second time "t2" (see FIG. 4B). In FIG. 4A, the hyperspectral imaging system 100c is positioned at the first time "t1" such that the optic(s) 106 receives light 115a associated with the remote object 104 and directs focused light 115b which represents an image 107 of the remote object 104 through the opening 414 on one side 416 of the rotating drum 402 to the fold mirror 408 which reflects the focused light 115b to form an image 107 of the remote object 104 on the inner portion 418 of the surface 406 (see exploded view 420) inside the rotating drum 402. In particular, the controller 114 would have interacted with the actuator 410 to rotate the drum 402 on the axis 412 such that the first straight slit 404a is in position "p1" at the first time "t1". At time "t1", the first straight slit 404a is positioned at or near an image plane of the optic(s) 106 so as to pass a first line of light 115c associated with the image 107 to the spectrometer 110 which is received by the dispersion element 116 by way of, for example, the first mirror 122 (see FIG. 1). Again, the spectrometer 110 can be any well known spectrometer 110 which has a dispersion device 116 (e.g., prism 116, diffraction grating 116). The dispersion device 116 generates dispersed light 115e which is received by the two-dimensional image sensor 112 by way of, for example, the second mirror 124 (see FIG. 1). The two-dimensional image sensor 112 generates a two-dimensional image 117a which includes one axis 410a representing the spatial information of the dispersed light 115e (e.g., the zero order image of a diffracted light 115e—if the diffraction grating 116 is used) and another axis 410b representing the spectral information of the dispersed light 115e (e.g., non-zero order images of the diffracted light 115e—if the diffraction grating 116 is used). The controller 114 receives and stores the two-dimensional image 117a and then interacts with the actuator 410 to rotate the drum 402 such that the first straight slit 404a is in position "p2" at time "t2" to pass a different line of light 115g associated with the image 107 from the remote object 104 to the spectrometer 110 as discussed next.

In FIG. 4B, the hyperspectral imaging system 100c is shown configured at the second time "t2" where the controller 114 interacted with the actuator 410 to rotate the drum 402 such that the first straight slit 404a is in position "p2" at time "t2" so as to pass a second line of light 115g associated with the image 107 of the remote object 104 into the spectrometer 110 which is received by the dispersion device 116 by way of, for example, the first mirror 122 (FIG. 1). As can be seen, the first line of light 115c is contiguous or substantially contiguous with the second line of light 115g associated with the image 107 of the remote object 104. The dispersion device 116 generates dispersed light 115i which is received by the two-dimensional image sensor 112 by way of, for example, the second mirror 124 (FIG. 1). The two-dimensional image sensor 112 generates a two-dimensional image 117b which includes one axis 410a representing the spatial information of the dispersed light 115i (e.g., the zero order image of a diffracted light 115i—if the diffraction grating 116 is used) and another axis 410b representing the spectral information of the dispersed light 115i (e.g., non-zero order images of the diffracted light 115i—if the diffraction grating 116 is used). The controller 114 receives and stores the two-dimensional image 117b. Thereafter, the controller 114 interacts with actuator 410 to rotate the drum 402 at different times "t3", "t4"..."tn" so that the first straight slit 404a sequentially has positions "p3", "p4"..."pn" while at times "t3", "t4"..."tn" the two-dimensional image sensor 112 is activated to obtain different two-dimensional images 117c, 117d...117n if the different dispersed lines of light of the remote object 104. The controller 114 combines the two-dimensional images 117a, 117b, 117c...117n to provide the hyperspectral image 102a of the entire image 107 associated with an area of the remote object 104. In this example, each two-dimensional image 117a, 117b, 117c...117n corresponds to a different dispersed line of light 115e, 115i etc. ... and the dispersed lines of light 115e, 115i etc. ... are contiguous with one another such than when their respective spectral images are combined the resulting combination forms the hyperspectral image 102a which represents the image 107 of the area of the remote object 104.

The same process which is used to obtain the hyperspectral image 102a of the area of the remote object 104 using the first straight slit 404a would be repeated to obtain a hyperspectral image 102b of the area of the remote object 104 using the second straight slit 404b and then repeated to obtain a hyperspectral image 102c of the area of the remote object 104 using the third straight slit 404c and so on. Hence, the drum 402 having "x" number of straight slits 404 enables "x" number of hyperspectral images 102 of the same image 107 of the area of the remote object 104 to be obtained per a single 360° rotation of the drum 402. The controller 114 can obtain the two-dimensional images 117a, 117b, 117c...117n at any desired data rate but typically it might be after the respective straight slit 404a, 404b, 404c and 404d has been rotated enough so that it's image (respective line of light from the image 107) on the two-dimensional image sensor 112 has moved laterally by one pixel.

In this example, the length of each of the straight slits 402a, 302b, 302c and 402d would be equal to or larger than a width 211 of the image 107 of the remote object 104. And, the widths of the straight slits 402a, 402b, 402c and 402d would dictate how many positions "p1", "p2", "p3"..."pn" and times "t1", "t2", "t3"..."tn" each straight slit 402a, 402b, 402c and 402d would have to be moved by rotating the drum 402 in order to account for the entire height 213 of the image 107 of the remote object 104. In other words, the widths of the straight slits 402a, 402b, 402c and 402d would dictate how many positions "p1", "p2", "p3"..."pn" and times "t1", "t2", "t3"..."tn" each straight slit 402a, 402b, 402c and 402d would have to be moved by rotating the drum 402 to enable all the contiguous lines of light 115c, 115g etc. ... to pass there through such that when all the lines of lights 115c, 115g etc. ... are combined then they would encompass the entire image 107. It should also be appreciated that any number of straight slits 404 (only four shown) could be formed on the drum 402 and that the straight slits 404 can have the same or different widths and lengths.

In the aforementioned example, the straight slits 404a, 404b, 404c and 404d are separated from one another far enough such that the image 107 of the remote object 104 is located in only one of the straight slits 404a, 404b, 404c and 404d at any given time. In other words, the image 107 could be entirely located in space between the straight slits 404a and 404b, or between the straight slits 404b and 404c, or between the straight slits 404c and 404d etc. ... In this regard, the 2D image 107 formed by the fore optic(s) 106 lies on the inner portion 418 of the drum 402 and for each angular position of the drum 404 the respective straight slit 404a (for example) only "passes" one line of the image 107 to the spectrometer 110. Based on the outer-diameter of the drum 402 and the size of the 2D image 107 to be scanned, the straight slits 404a, 404b, 404c and 404d will be angularly spaced from one another, such that when one straight slit 404a (for example) leaves the 2D field of view of the optic(s) 106 then the next straight slit 404b (for example) is just entering the 2D field of view of the image 107. This results in 100% scan efficiency. In this situation, as the straight slit 404a (for example) traverses the focal plane of the optic(s) 106, it also moves in and out of focus. To address this problem, the drum 402 would ideally be large enough such that the straight slit 404a (for example) remains within the depth of focus of the optic(s) 106.

Alternatively, the straight slits 404a, 404b, 404c and 404d can be positioned with respect to one another such that any two of the straight slits 404a and 404b (for example) at a given time can each have a portion which simultaneously passes a different line of light from the image 107 of the remote object 104 into the spectrometer 110. In this case, the controller 114 upon receiving the two-dimensional image from the two-dimensional image sensor 112 would process the two-dimensional image to separate the two-dimensional image associated with first straight slit 404a from the two-dimensional image associated with second straight slit 404b. Then, the controller 114 would later combine the various two-dimensional images associated with only the first straight slit 404a to form the hyperspectral image 102a and then combine the various two-dimensional images associated only the second straight slit 404b to form the hyperspectral image 102b.

Referring to FIG. 4C, there is a flowchart illustrating the steps of an exemplary method 400C for using the hyperspectral imaging system 100c to provide the hyperspectral image 102 of the two-dimensional area 107 of the remote object 104 in accordance with the third embodiment of the present invention. The method comprises the steps of: (a) providing the hyperspectral imaging system 100c which includes the optic(s) 106, the rotatable drum 402 (which has a at least one straight slit 404 on a surface 406 thereof and a fold mirror 408 located therein), the actuator 410, the spectrometer 110 (which includes at least an dispersion device 116), the two-dimensional image sensor 112, and the controller 114 (step 402C); (b) positioning the optic(s) 106 to receive light 115a associated with the remote object 104 (step 404C); (c) positioning the drum 402 so that an opening 414 on one side 416 thereof is positioned to receive the light 115b from the optic(s) 106 and the fold mirror 408 is positioned to reflect the light 115b received from the optic(s) 106 towards the inner portion 418 of the surface 406, and where inner portion 418 of the surface 406 is positioned at an image plane of the optic(s) 106 (step 406C); (d) controlling the actuator 410 such that the drum 402 is rotated so a slit 404 is positioned to allow a first line of light 115c associated with the remote object 104 to pass there through to the spectrometer 110 comprising at least the dispersion device 116 configured to receive the first line of light 115c and output a first dispersed line of light 115e to the two-dimensional image sensor 112 (step 408C); (e) obtaining a two dimensional image 117a of the first dispersed line of light 115g from the two-dimensional image sensor 112 (step 410C); (f) controlling the actuator 410 such that the drum 402 is rotated so the slit 404 is positioned to allow a second line of light 115g associated with the remote object 104 to pass there through to the spectrometer 110 comprising at least the dispersion device 116 configured to receive the second line of light 115g and output a second dispersed line of light 155i to the two-dimensional image sensor 112 (step 412C); (g) obtaining a two dimensional image 117b of the second dispersed line of light 115i from the two-dimensional image sensor 112 (step 414C); and (h) repeatedly controlling the actuator 410 such that the drum 402 is rotated so the slit 404 is positioned to allow different lines of light associated with the light of the remote object 104 to pass there through while repeatedly obtaining two dimensional images 117c, 117d . . . 117n of the different dispersed lines of light from the two-dimensional image sensor 112 and combining the first and second two dimensional images 117a and 117b and the different two dimensional images 117c, 117d . . . 117d to provide the hyperspectral image 102 of the two-dimensional area 107 of the remote object 104 (step 416C). In one example, the controller 114 can control the actuator 410 to rotate the drum 402 at a continuous constant speed while obtaining the first and second two dimensional images 117a and 117b and the different two dimensional images 117c, 117d . . . 117n. In the above example, the controller 114 may include a processor 115 that interfaces with a memory 117 which stores processor-executable instructions to execute those processor-executable instructions to perform steps 404C, 406C, 408C, 410C, 412C, 414C and 416C.

Although multiple embodiments of the present invention have been illustrated in the accompanying Drawings and described in the foregoing Detailed Description, it should be understood that the invention is not limited to the disclosed embodiments, but is capable of numerous rearrangements, modifications and substitutions without departing from the invention as set forth and defined by the following claims. It should also be noted that the reference to the "present invention" or "invention" used herein relates to exemplary embodiments and not necessarily to every embodiment that is encompassed by the appended claims.

The invention claimed is:

1. A hyperspectral imaging system for providing a hyperspectral image of a two-dimensional area of a remote object, the hyperspectral imaging system comprising:
   at least one optic configured to receive light associated with the remote object;
   a disk with a plurality of straight slits formed therein, where the disk comprises a surface configured to receive the light from the at least one foreoptic, and where the surface is further positioned at an image plane of the at least one optic;
   an actuator that rotates the disk;
   a controller configured to control the actuator such that the disc is rotated so a first straight slit of the plurality of straight slits is positioned to allow a first line of light associated with the remote object to pass there through;
   a spectrometer comprising at least a dispersion device configured to receive the first line of light and output a first dispersed line of light;
   a two-dimensional image sensor configured to receive the first dispersed line of light and provide a first two dimensional image of the first dispersed line of light;
   the controller configured to obtain the first two dimensional image and control the actuator such that the disc is rotated so a second straight slit of the plurality of straight slits is positioned to allow a second line of light associated with the remote object to pass there through;
   the spectrometer comprising at least the dispersion device configured to receive the second line of light and output a second dispersed line of light;
   the two-dimensional image sensor configured to receive the second dispersed line of light and provide a second two dimensional image of the second dispersed line of light; and
   the controller configured to obtain the second two dimensional image.

2. The hyperspectral imaging system of claim 1, wherein the controller repeatedly controls the actuator such that the disc is rotated so different straight slits of the plurality of straight slits are positioned to allow different lines of light associated with the light of the remote object to pass there through while repeatedly obtaining two dimensional images of the different dispersed lines of light from the two-dimensional image sensor and combining the first and second two dimensional images and the different two dimensional images to provide the hyperspectral image of the two-dimensional area of the remote object.

3. The hyperspectral imaging system of claim 2, wherein the controller controls the actuator to rotate the disk at a constant speed while obtaining the first and second two dimensional images and the different two dimensional images.

4. The hyperspectral imaging system of claim 2, wherein the dispersion device is a diffraction grating.

5. The hyperspectral imaging system of claim 2, wherein the dispersion device is a prism.

6. The hyperspectral imaging system of claim 2, wherein the plurality of straight slits are located on an interior portion of the disc.

7. The hyperspectral imaging system of claim 2, where the first line of light is associated with a first portion of the light associated with the remote object and the second line of light is associated with a second portion of the light associated with the remote object and where the first portion of the light associated with the remote object is contiguous with the second portion of the light associated with the remote object.

8. A method for providing a hyperspectral image of a two-dimensional area of a remote object, the method comprising the steps of:
   providing a hyperspectral imaging system comprising:
      at least one optic;
      a disk with a plurality of straight slits formed therein;
      an actuator that rotates the disk;
      a controller;
      a spectrometer; and
      a two-dimensional image sensor;
   positioning the at least one optic to receive light associated with the remote object;
   controlling the actuator such that the disc is rotated so a first straight slit of the plurality of straight slits is positioned to allow a first line of light associated with the remote object to pass there through to the spectrometer comprising at least a dispersion device configured to receive the first line of light and output a first dispersed line of light to the two-dimensional image sensor;
   obtaining a first two dimensional image of the first dispersed line of light from the two-dimensional image sensor;
   controlling the actuator such that the disc is rotated so a second straight slit of the plurality of straight slits is positioned to allow a second line of light associated with the remote object to pass there through to the spectrometer comprising at least the dispersion device configured to receive the second line of light and output a second dispersed line of light to the two-dimensional image sensor; and obtaining a second two dimensional image of the second dispersed line of light from the two-dimensional image sensor.

9. The method of claim 8, further comprising steps of repeatedly controlling the actuator such that the disc is rotated so different straight slits of the plurality of straight slits are positioned to allow different lines of light associated with the light of the remote object to pass there through while repeatedly obtaining two dimensional images of the different dispersed lines of light from the two-dimensional image sensor and combining the first and second two dimensional images and the different two dimensional images to provide the hyperspectral image of the two-dimensional area of the remote object.

10. The method of claim 9, wherein the actuator is controlled to rotate the disk at a constant speed while obtaining the first and second two dimensional images and the different two dimensional images.

11. The method of claim 8, wherein the dispersion device is a diffraction grating.

12. The method of claim 8, wherein the dispersion device is a prism.

13. The method of claim 8, wherein the plurality of straight slits are located on an interior portion of the disc.

14. The method of claim 8, where the first line of light is associated with a first portion of the light associated with the remote object and the second line of light is associated with a second portion of the light associated with the remote object and where the first portion of the light associated with the remote object is contiguous with the second portion of the light associated with the remote object.

* * * * *